US012238476B2

(12) United States Patent
Hui et al.

(10) Patent No.: US 12,238,476 B2
(45) Date of Patent: Feb. 25, 2025

(54) SPEAKER MODULE

(71) Applicant: AAC Technologies Pte. Ltd., Singapore (SG)

(72) Inventors: Yao Hui, Shenzhen (CN); Juha Backman, Tampere (FI); Yufen Chu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 17/921,957

(22) PCT Filed: Aug. 9, 2022

(86) PCT No.: PCT/CN2022/111196
§ 371 (c)(1),
(2) Date: Oct. 27, 2022

(87) PCT Pub. No.: WO2024/016401
PCT Pub. Date: Jan. 25, 2024

(65) Prior Publication Data

US 2024/0223941 A1 Jul. 4, 2024

(30) Foreign Application Priority Data

Jul. 19, 2022 (CN) ........................ 202210849600.X

(51) Int. Cl.
*H04R 25/00* (2006.01)
*H04R 1/28* (2006.01)
*H04R 1/30* (2006.01)

(52) U.S. Cl.
CPC ............. *H04R 1/30* (2013.01); *H04R 1/2811* (2013.01); *H04R 2499/11* (2013.01)

(58) Field of Classification Search
CPC .......... H04R 1/28; H04R 1/2811; H04R 1/30; H04R 1/345; H04R 2499/11; H04R 2400/11
USPC .......................................................... 381/342
See application file for complete search history.

(56) References Cited

FOREIGN PATENT DOCUMENTS

CN 205584489 U * 9/2016

OTHER PUBLICATIONS

Translation CN-205584489-U (Year: 2016).*

* cited by examiner

*Primary Examiner* — Phylesha Dabney
(74) *Attorney, Agent, or Firm* — W&G Law Group

(57) ABSTRACT

The invention provides a speaker module for a mobile terminal with a sound output port. The speaker module includes a speaker box. The speaker box includes a sound output opening for side surface sound. The speaker module also includes a horn barre. The horn barrel has openings arranged at both ends. A sectional area along the sound output direction of the horn barrel changes gradually. By designing a variable sectional surface with different areas or lengths and widths on the horn barrel for stakeout, the size of the variable sectional surface is directly related to the sound quality of each part of the horn barrel. The horn barrel widens the frequency band range. Compared with the related art, the present invention can realize multi-level resonance, has a small volume, is convenient to widen the frequency band range and has flexible avoidance space.

7 Claims, 10 Drawing Sheets

A-A

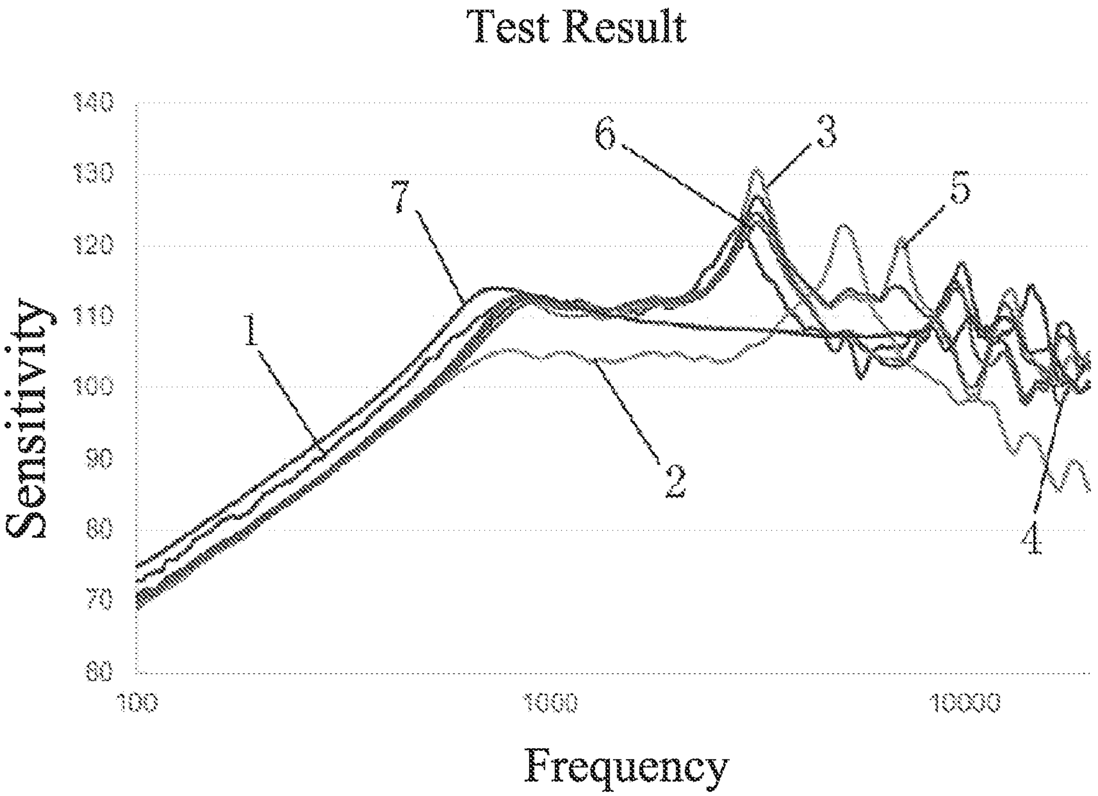

1- multi-level horn plus sound port matching module
2- normal side-sounding module MicSPL (dB)
3- initial version level 2 horn MicSPL (dB)
4- initial version level 2 horn plus sound absorbing MicSPL (dB)
5- multi-level horn with variable sectional surface MicSPL (dB)
6- multi-level horn with variable sectional surface plus sound-absorbing material MicSPL (dB)
7- large back cavity module

Fig. 14

SPEAKER MODULE

FIELD OF THE PRESENT DISCLOSURE

The present invention relates to the field of electro-acoustic transducers, and in particular relates to a speaker module.

DESCRIPTION OF RELATED ART

With the development of electro-acoustic conversion technology, it has been used in terminal electronic devices such as computers, mobile phones, mp4, and PDA. With the continuous progress and development of the electronics industry and science and technology, the audience will inevitably put forward higher requirements for the acoustic performance of the speaker, so the speaker module is widely used in various terminal equipment.

The upper top surface and the lower bottom surface of the speaker's horn barrel in the related art are both planes in the thickness direction of the terminal device, upper top surface is parallel to the upper housing surface of the terminal device, and the lower bottom surface is parallel to the lower housing surface of the terminal device. The horn barrel has an extension from the horn barrel mouth to the horn barrel throat in the thickness direction perpendicular to the terminal equipment and the length direction of the horn barrel. Therefore, under the premise that the thickness of the terminal equipment is relatively thin, the miniature speaker is combined with the horn barrel to achieve the purpose of low resonance frequency f0 and high loudness.

However, the horn barrel of the related art has a large volume, has a high requirement for shape expansion, cannot flexibly form an avoidance space, and has poor resonance effect.

Therefore, it is necessary to provide a new speaker module to solve the above problems.

SUMMARY OF THE PRESENT INVENTION

The present invention is to overcome the above-mentioned technical problems and to provide a speaker module with small size, flexible space avoidance, good multi-level harmonic effect and effectively widening the frequency band range.

Accordingly, the present invention provides a speaker module for mobile terminal with a sound output port, including: a speaker box having a sound output opening in a side surface thereof for generating sound; and a hollow horn barrel with two openings at both ends thereof, connected to the sound output opening. One of the openings of the horn barrel communicates with the sound output opening, and the other opening of the horn barrel communicates with the sound output port of the mobile terminal. An area of a cross-section of the horn barrel along a sound output direction is gradually changed.

In addition, the horn barrel includes a top surface and a bottom surface spaced along a thickness direction of the speaker box, and two side surfaces respectively connecting to the bottom surface and the top surface; the bottom surface and/or the top surface are curved.

In addition, the horn barrel includes a first section connected to the sound output opening, a second section that is bent and extended from the end of the first section away from the speaker box and is spaced from the speaker box, and a third section formed by extending from one end of the second section away from the first section; the third section is for connecting to the mobile terminal's sound output port; the bottom surface corresponding to the first section and the second section are both plane; the top surface corresponding to the first section is the first arc surface; the top surface corresponding to the second section is the second arc surface; the bottom surface and the top surface corresponding to the third section are the third arc surface and the fourth arc surface, respectively; the first arc surface, the second arc surface, the third arc surface and the fourth arc surface are different.

In addition, a bending radius of a connection between the first section and the second section is greater than 4 times a minimum wavelength.

In addition, an inner diameter of the connection between the first section and the second section is smaller than a half of the wavelength.

In addition, the speaker box is rectangular, and the sound output opening is formed along a short axis edge of the speaker box.

In addition, the horn barrel includes a plurality of first sections arranged side by side along a width direction of the speaker box, a plurality of the second sections arranged alternately and stacked along a thickness direction of the speaker box; the third sections of the horn barrels are arranged side by side along a length direction of the speaker box.

In addition, the second section and/or the third section is filled with sound absorbing material.

Compared with the related art, the speaker module of the present invention is used for a mobile terminal provided with a sound output port. The speaker module includes a speaker box. The speaker box includes a sound output opening for side surface sound. The speaker module also includes a horn barrel connected to the sound output opening. The horn barrel is hollow in the middle and openings are arranged at both ends. The horn barrel is connected to the side surface of the speaker box and connected with the sound output opening, and the other end of the horn barrel is used to connect to the sound output port of the mobile terminal. The sectional area along the sound output direction of the horn barrel changes gradually. By designing a variable sectional surface with different areas or lengths and widths on the horn barrel for stakeout, the size of the variable sectional surface is directly related to the sound quality of each part of the horn barrel. The impeders of each part of the horn barrel are fully coupled to achieve multi-level resonance in a small volume and widen the frequency band range. At the same time, it is small in size and flexibly avoids space to adapt to the chassis of different mobile terminals.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

FIG. 14 is a SPL curve of an acoustic performance test result of the speaker module of the present invention.

DETAILED DESCRIPTION OF THE EXEMPLARY EMBODIMENT

Figure 1:
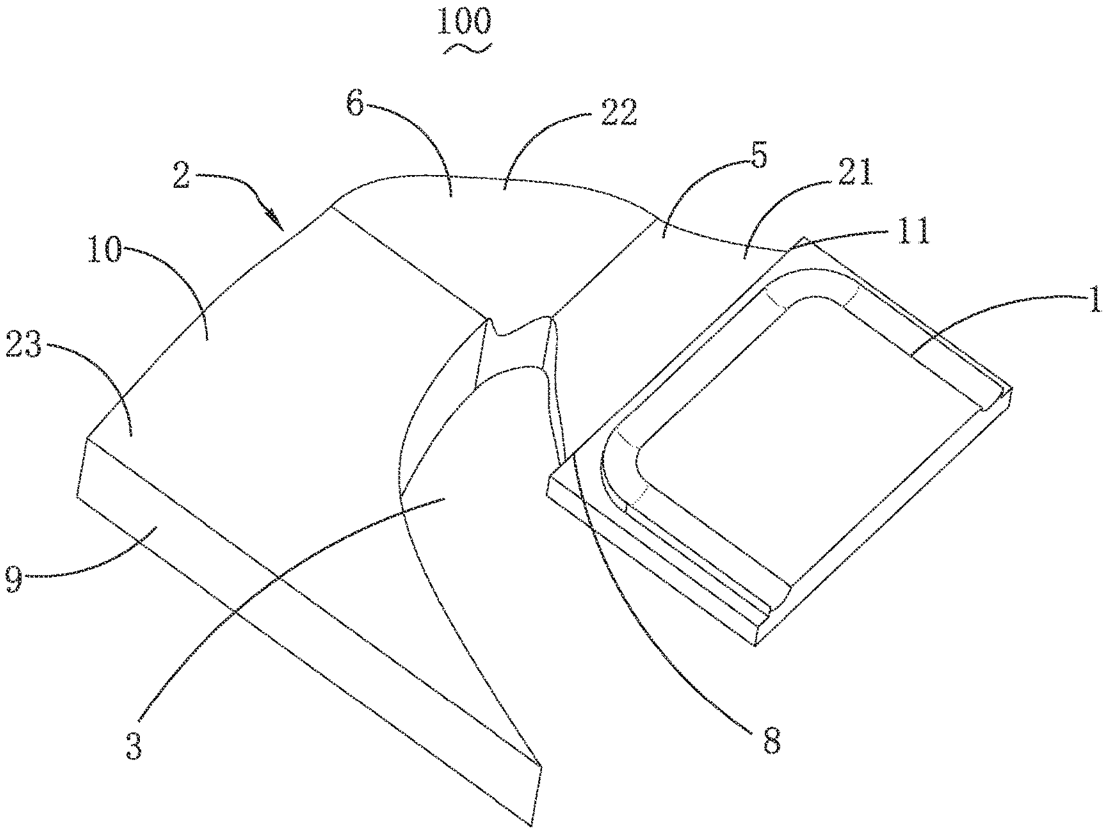
FIG. 1 illustrates a speaker module in accordance with an exemplary embodiment of the present invention.
Figure 2:
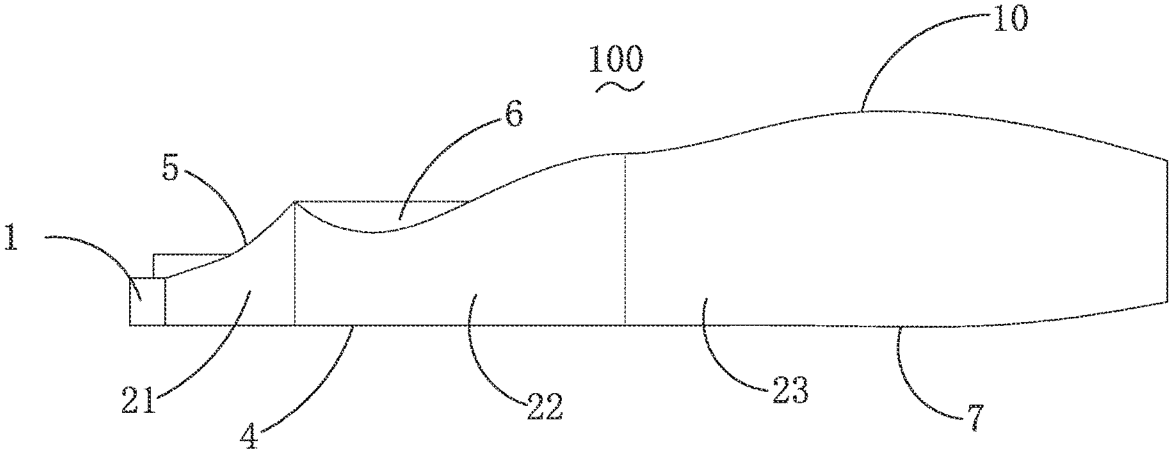
FIG. 2 is a left-view of the speaker module in FIG. 1.
Figure 3:
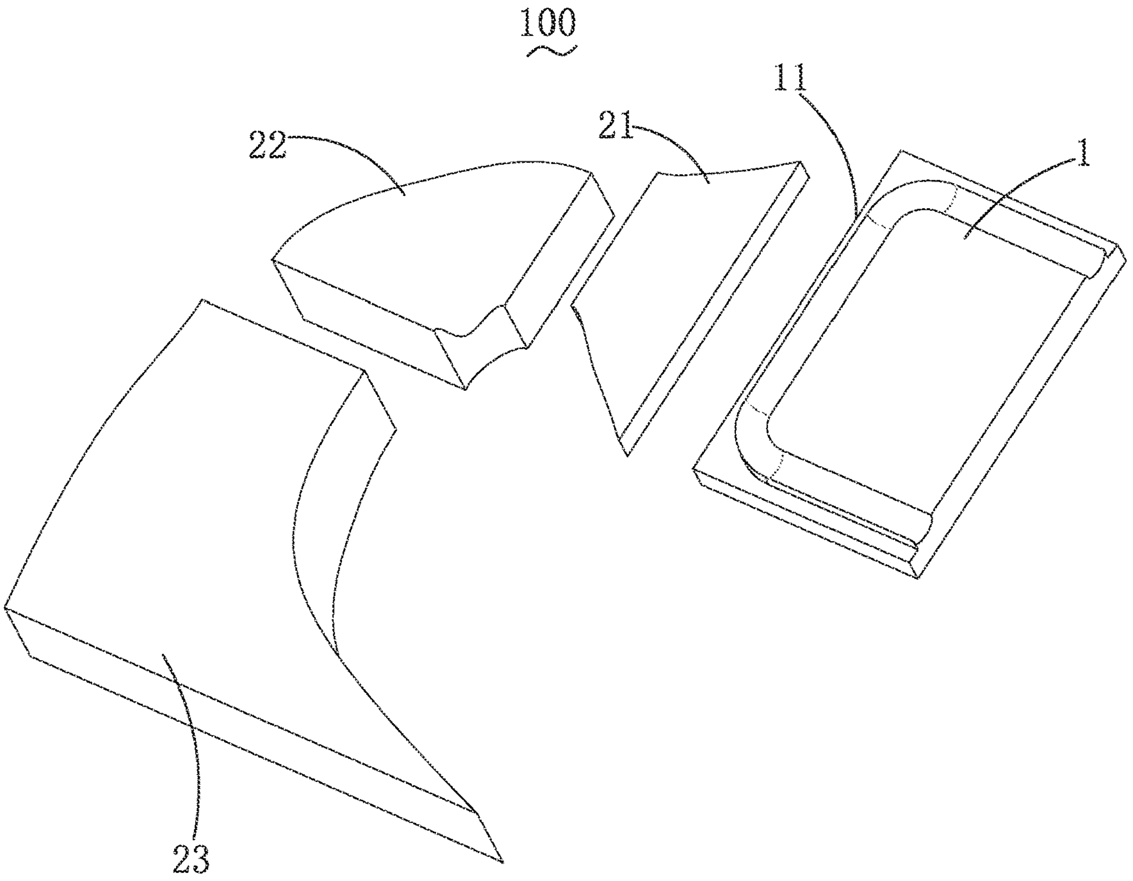
FIG. 3 is an exploded view of the speaker module in FIG. 1.
Figure 4:
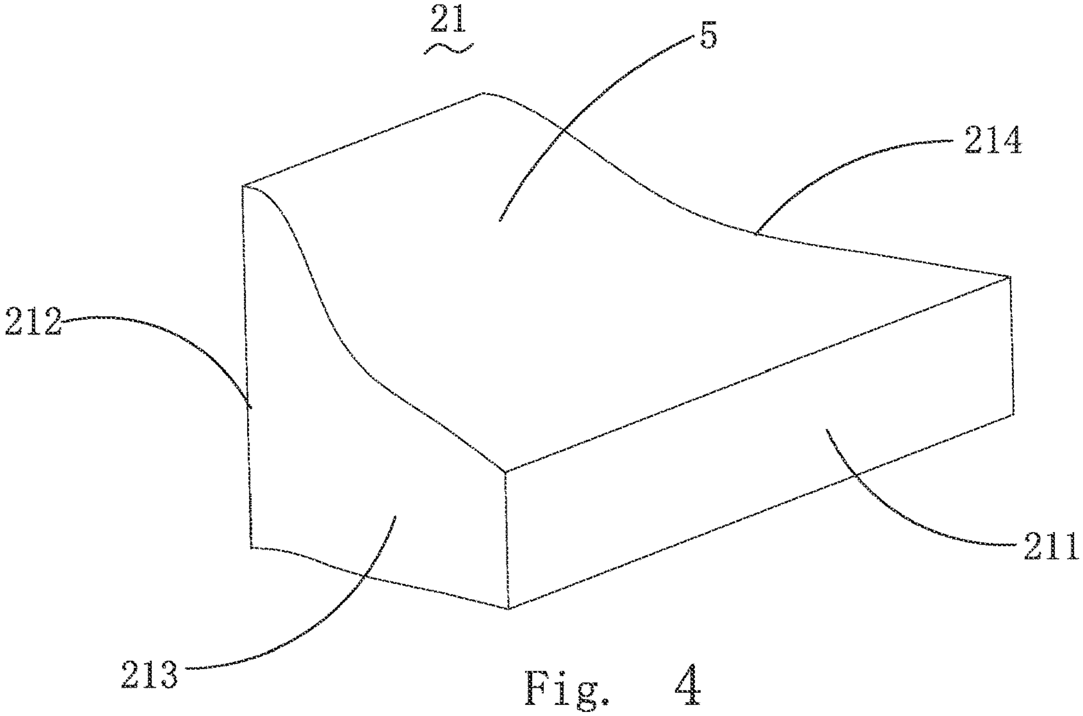
FIG. 4 illustrates a first section of a horn barrel in FIG. 1.
Figure 5:
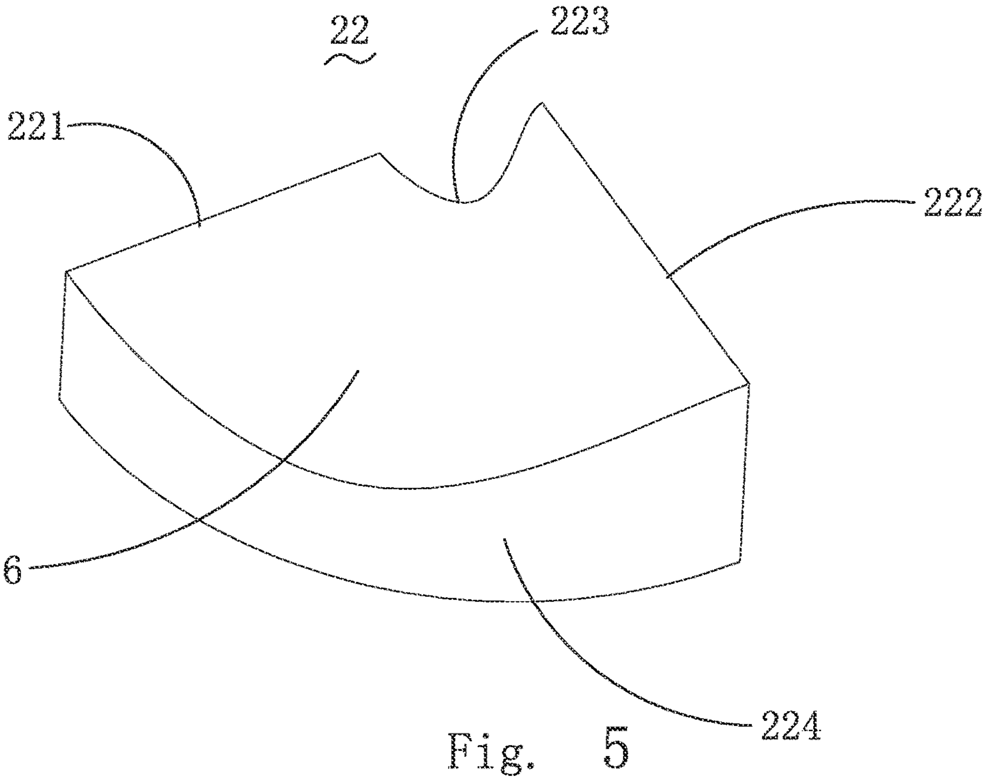
FIG. 5 illustrates a second section of the horn barrel in FIG. 1.
Figure 6:
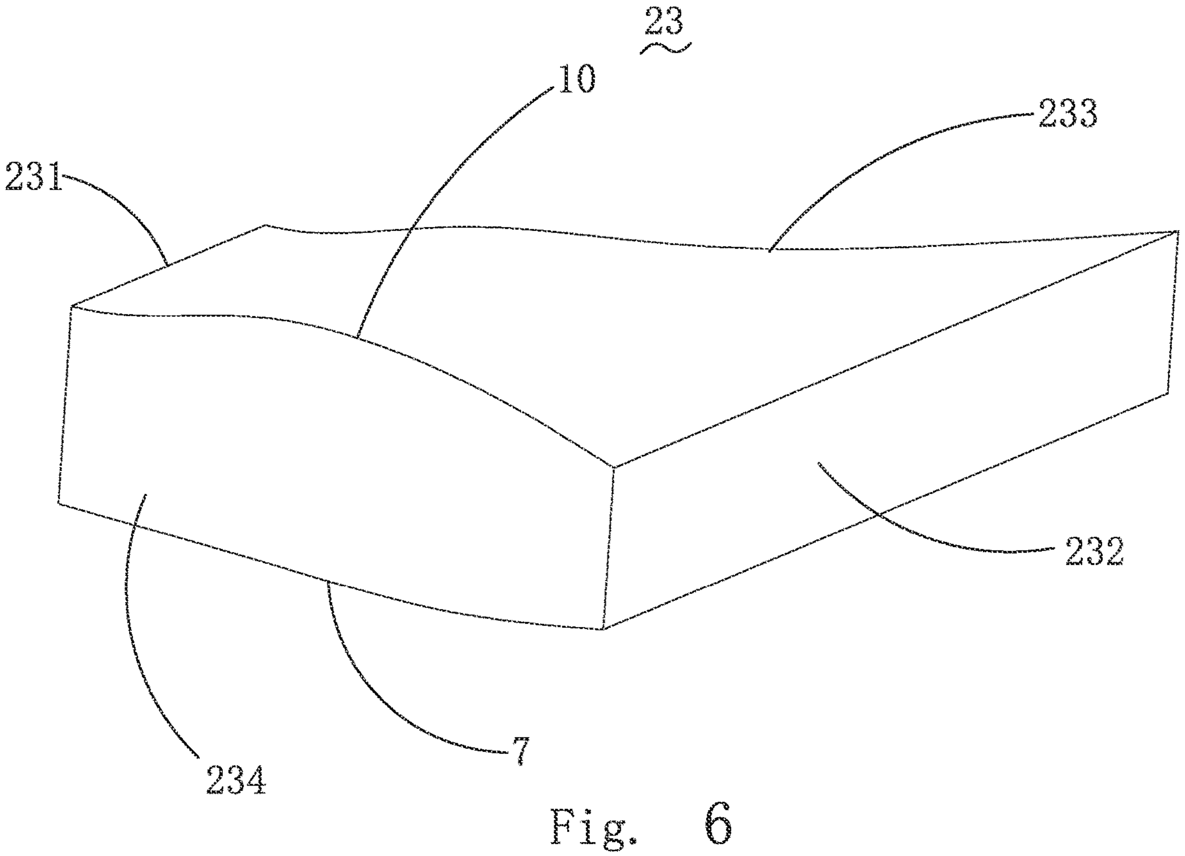
FIG. 6 illustrates a third section of the horn barrel in FIG. 1.
Figure 7:
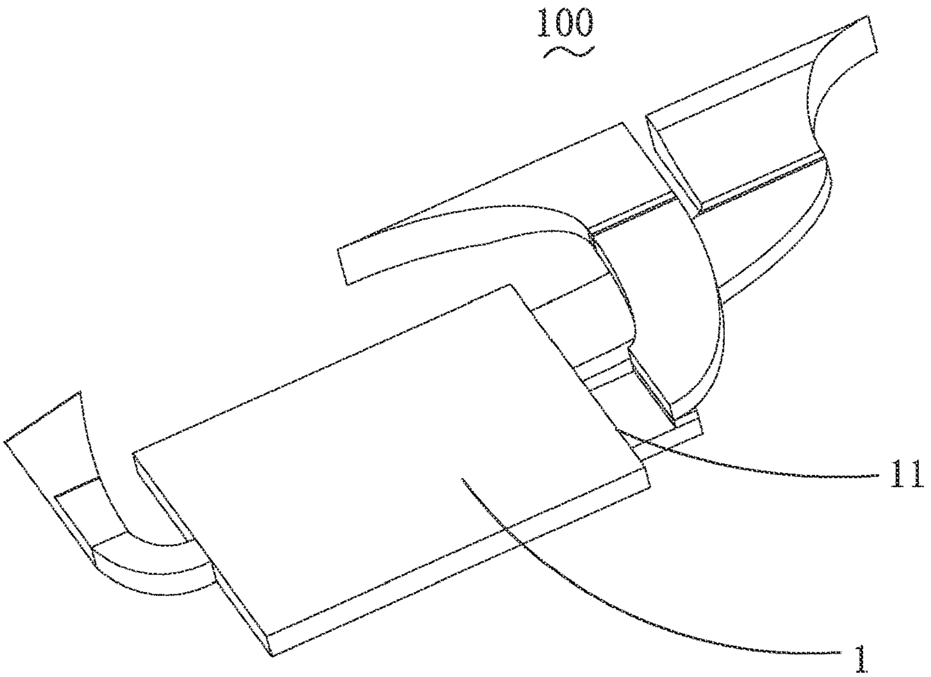
FIG. 7 illustrates an overlapping multiple horn barrels of the speaker module of the present invention.
Figure 8:
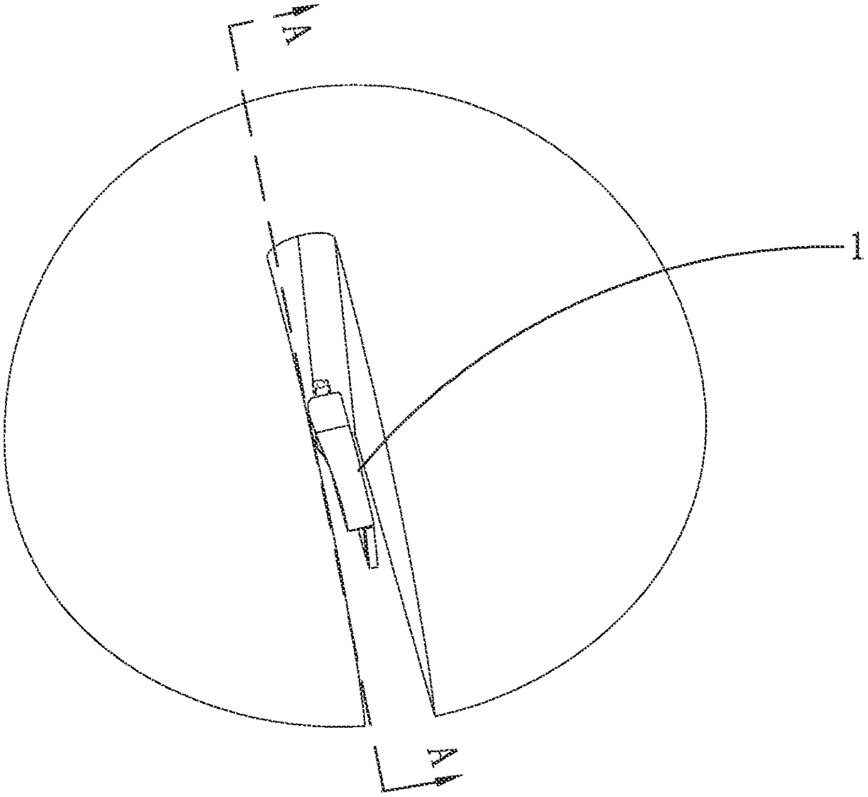
FIG. 8 illustrates a sound absorbing material of the speaker module of the present invention reducing a volume of the horn barrel.
Figure 9:
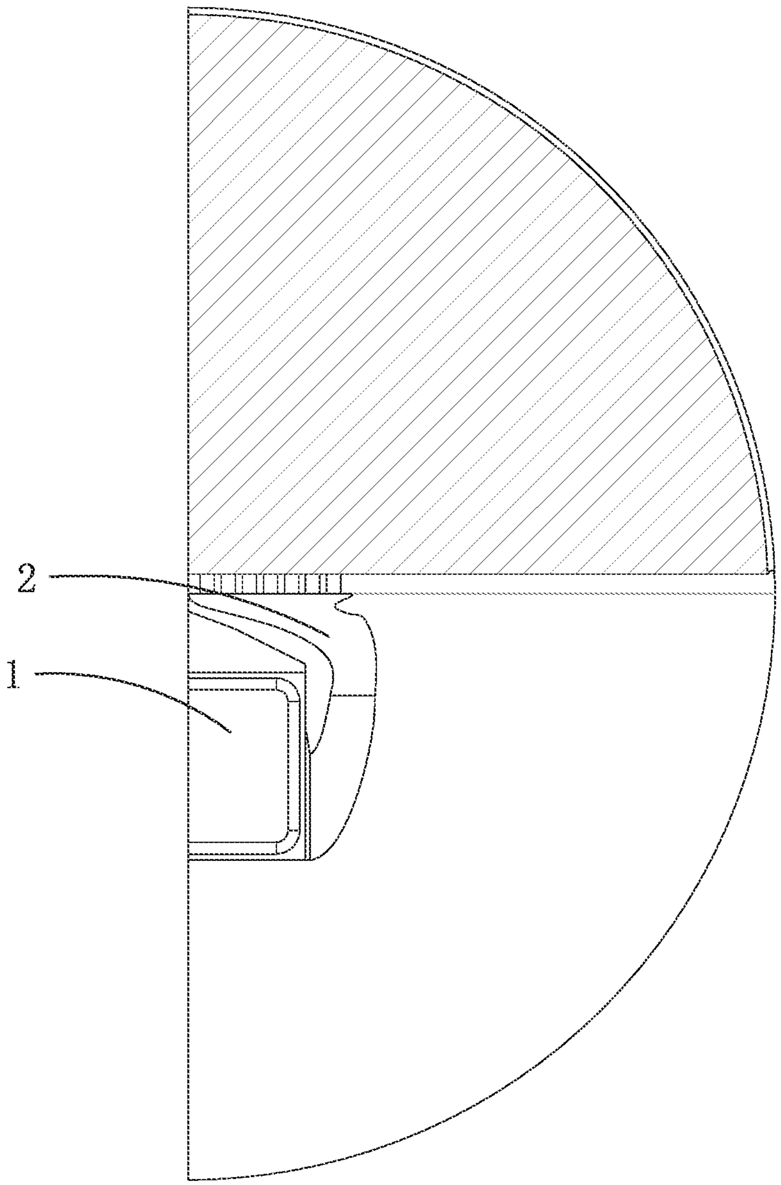
FIG. 9 is a cross-sectional view taken along line A-A in FIG. 8.

The present disclosure will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain the disclosure, not intended to limit the disclosure.

Referring to FIGS. 1-9, a speaker module 100 is provided for a mobile terminal (not shown) provided with a sound output port (not shown). The speaker module 100 includes a speaker box 1. The speaker box 1 includes a sound output opening 11 for the side surface to generate sound. The speaker module 100 further includes a horn barrel 2 connected to the sound output opening 11, horn barrel 2 is hollow and openings are arranged at both ends, the horn barrel 2 is connected to the side surface of the speaker box 1 and connected with the sound output opening 11, and the other end of the horn barrel 2 is used to connect to the sound output port of the mobile terminal. Along the sound output direction of the horn barrel 2, the sectional area of the horn barrel 2 is gradually changing. By designing the variable sectional surface on the horn barrel 2 as a variable sectional surface with different areas or lengths and widths, the size of the variable sectional surface is directly related to the sound quality of each part of the horn barrel 2. The impeder of each part of the horn barrel 2 is fully coupled, so as to achieve small volume multi-level resonance and widen the frequency band range. At the same time, it is small in size and flexibly avoids space to adapt to the chassis of different mobile terminals.

Optionally, the mobile terminal may be a mobile phone, a computer, a tablet, or the like. By adapting the speaker module 100 into the mobile terminal, and assembling the speaker box 1 and the mobile terminal through the horn barrel 2, it is convenient to improve the acoustic performance of the mobile terminal.

In this embodiment, the horn barrel 2 includes a top surface and a bottom surface spaced along the thickness direction of the speaker box 1, and two side surfaces respectively connecting the bottom surface and the top surface. The bottom surface and/or the top surface are curved.

Wherein, the speaker in the speaker box 1 includes a diaphragm. In the speaker box 1 where the side surface emits sound, the vibration direction of the diaphragm is the thickness direction of the speaker box 1. The top surface and the bottom surface of the horn barrel 2 are arranged at intervals in the thickness direction, and the two side surfaces are respectively connected to the bottom surface and the top surface. The sectional surface of the horn barrel 2 in the sound output direction achieves a gradually changing effect, realizes multi-level resonance, and broadens the frequency band range.

In this embodiment, the horn barrel 2 includes a first section 21 connecting the sound output opening 11, a second section 22 that is bent and extended from the first section 21 to the end away from the speaker box 1 and is spaced from the speaker box and a third section 23 formed by an end of the second section 22 extending away from the first section. The third section 23 is for connecting to the mobile terminal's sound output port. The bottom surfaces corresponding to the first section 21 and the second section 22 are both plane 4. The top surface of the first section 21 is the first arc surface 5. The top surface corresponding to the second section 22 is the second arc surface 6. The bottom surface and the top surface corresponding to the third section 23 are the third arc surface 7 and the fourth arc surface 10, respectively. The radians of the first arc surface 5, the second arc surface 6, the third arc surface 7 and the fourth arc surface 10 are different.

Specifically, the sound output opening 11 set on the sound output side of the speaker box 1 is connected to the horn barrel 2 to transmit the sound emitted by the speaker box 1, thereby improving the acoustic performance of the speaker box 1. Since the horn barrel 2 includes first section 21, second section 22 and third section 23. By designing the variable sectional surface on the horn barrel 2 as a variable sectional surface with different areas or lengths and widths, the size of the variable sectional surface is directly related to the sound quality of each part of the horn barrel 2. The impeder of each part of the horn barrel 2 is fully coupled, so as to achieve small volume multi-level resonance and widen the frequency band range.

Figure 10:
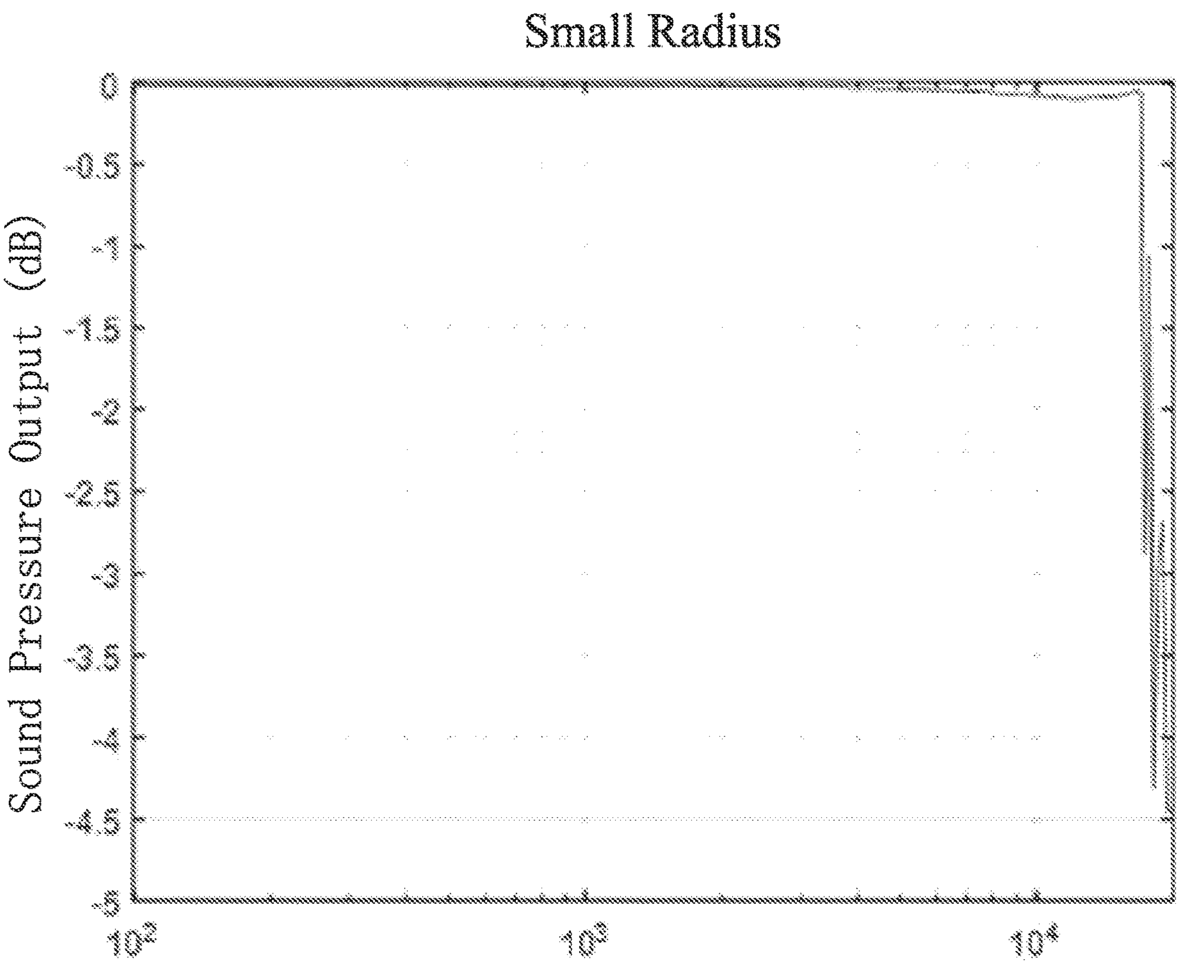
FIG. 10 is an SPL curve of a transmission frequency response of the speaker module.
Figure 11:
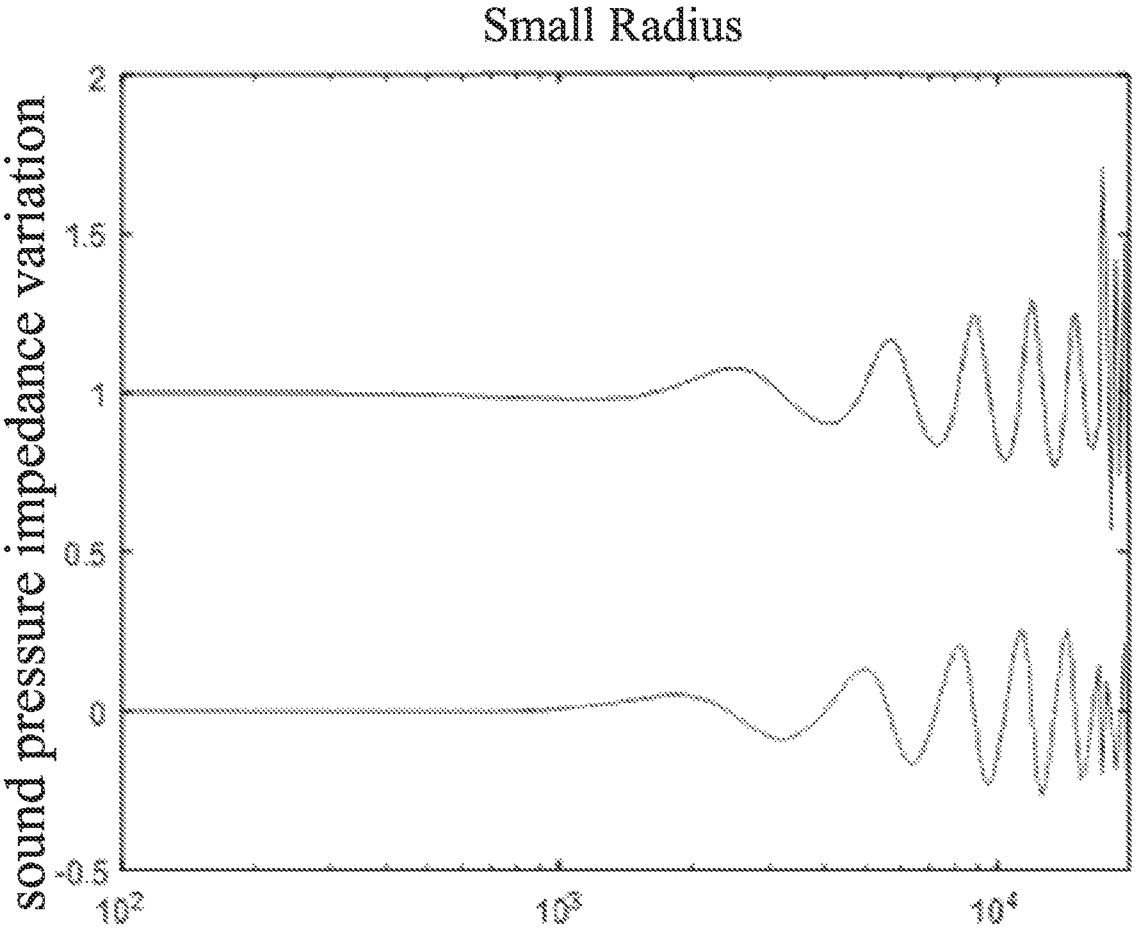
FIG. 11 is a sound pressure impedance variation curve of the speaker module.

In this embodiment, the bending radius of the connection between the first section 21 and the second section 22 is greater than 4 times the minimum wavelength. As shown in FIGS. 10-11, simulations show that excellent acoustic transmission performance can be achieved when the bending radius exceeds 4 times the minimum wavelength.

Preferably, the sound output directions of the first section 21 and the third section 23 are bent at 900 through the second section 22, so that the volume of the horn barrel is small. It is designed according to the sectional surface of the curved path, it can be adapted to the chassis of the mobile terminal, and the avoidance effect is good.

In this embodiment, the inner diameter of the connection between the first section 21 and the second section 22 is smaller than half wavelength. When the radius of the horn barrel 2 is smaller than the half wavelength, the high-frequency sound waves are reversed through the bend, resulting in a sound cut-off phenomenon. If the horn barrel 2 adopts a bending size smaller than half wavelength, it will improve its high frequency cutoff and widen the bandwidth. Based on the transmission line model, the vertical direction of the horn barrel 2 is designed as a variable sectional surface with different areas or lengths and widths for stake-out. The variable sectional surface is directly related to the sound quality of each part of the horn barrel, and the impedance of each part of the horn barrel is fully coupled to achieve multi-level resonance.

In this embodiment, the speaker box 1 is rectangular, and the sound output opening 11 is set at the short axis edge of the speaker box.

Figure 12:
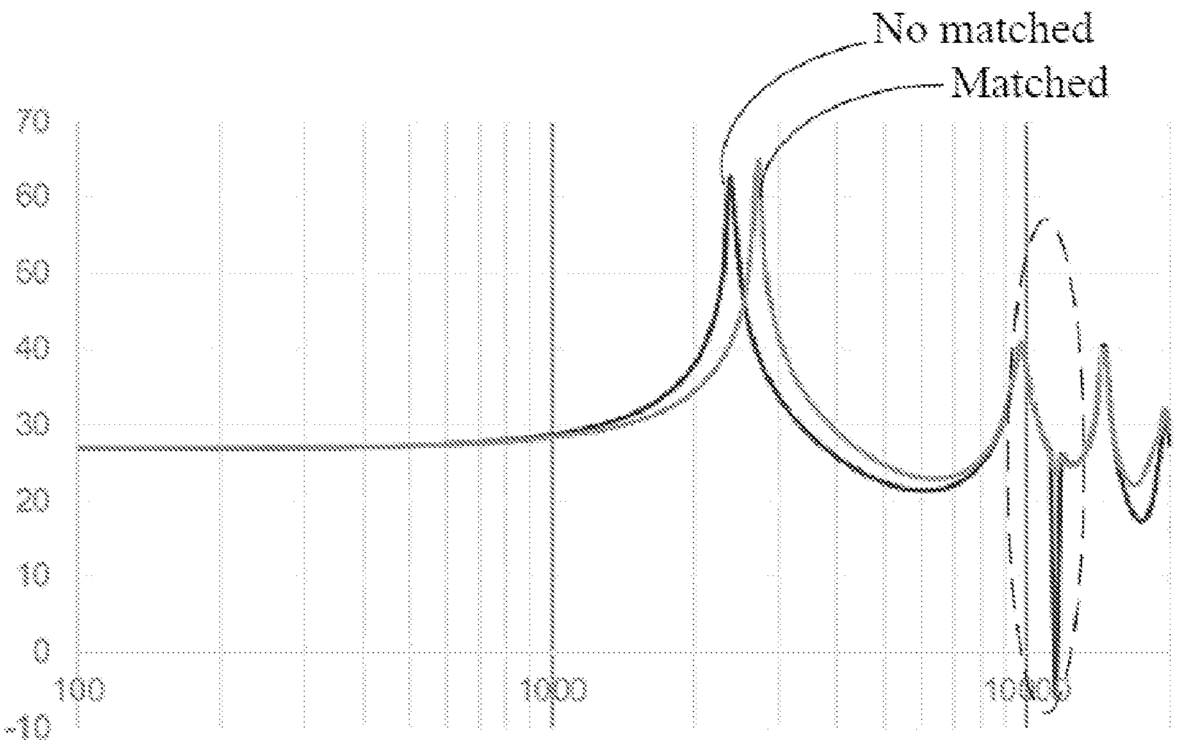
FIG. 12 is a matching SPL curve of the speaker module of the present invention.

Specifically, after adding the chassis hole of the mobile terminal, the frequency response curve of the symmetrical horn barrel 2 produces a very deep valley value at 11.5 khz. As shown in FIG. 12, a sound pressure node appears in the direction of the speaker horizontal axis at this frequency, resulting in a pit valley in the sound output. The sound output port in the vertical axis direction is increased, the sound pressure intensity on both sides of the horizontal axis is changed, the 11.5 khz valley value is improved, and the acoustic performance is good.

In this embodiment, a plurality of the horn barrel 2 are included. The first sections of the horn barrels 2 are arranged side by side along the width direction of the speaker box 1. The second sections 22 of the plurality of the horn barrels 2 are arranged alternately and stacked along the thickness direction of the speaker box 1. The third sections 23 of the horn barrels 2 are arranged side by side along the length direction of the speaker box 1. Optionally, the multiple horn barrels 2 are 2, 3, 4, etc., which are selected according to actual needs.

Specifically, using the speaker to divide the horn barrel 2 into multiple layers, the width of the single-layer horn barrel 2 is controlled to be smaller than the half wavelength. The cutoff frequency of the horn barrel 2 is increased to achieve smooth sound transmission and improve high frequency performance. By changing the sectional surfaces of the first section 21 and the second section 22 of the two horn barrels 2 gradually, the resonance peaks of each horn barrel 2 are coupled to improve the high frequency performance. At the same time, the volume and space requirements can be reduced, the lengths of multiple first sections 21 and second sections 22 can be extended, and the number of resonance frequencies can be increased. Multi-level resonance is controlled by multiple horn barrel 2 parts to achieve high frequency boost effect of multiple frequencies.

Preferably, when there are three horn barrels 2, the three horn barrels 2 are arranged side by side or cross each other. It is also possible that two horn barrels 2 are placed side by side, and one horn barrel 2 overlaps with one of the two horn barrels 2 or is arranged between the two horn barrels 2. Multi-level resonance is controlled by multiple horn barrel 2 parts to achieve high frequency boost effect of multiple frequencies.

In this embodiment, the second section 22 and/or the third section 23 are filled with sound absorbing material. Increase the damping of the horn barrel 2 by filling the sound absorbing material, compensate the symmetrical horn barrel 2 response curve, and improve the high frequency performance.

Figure 13:
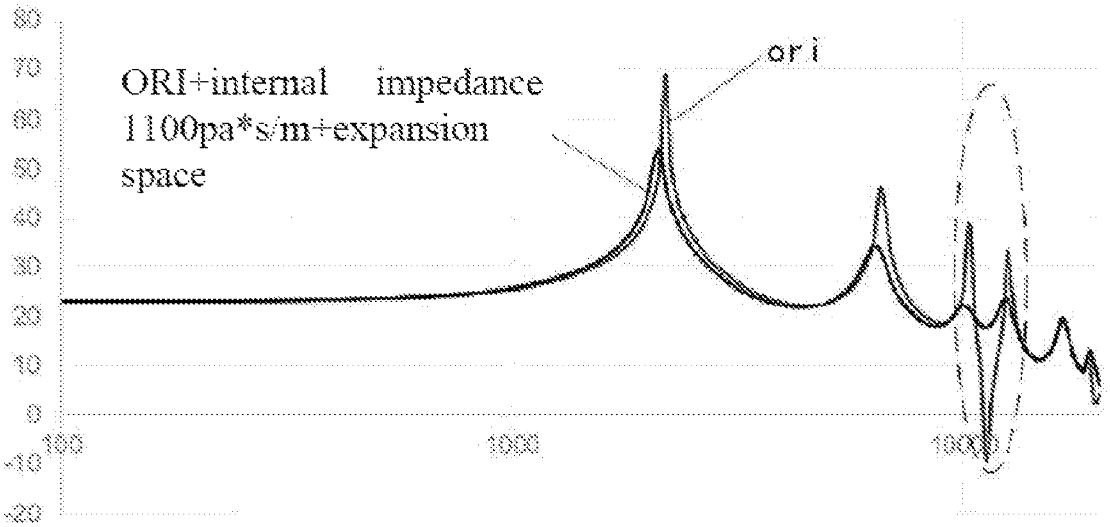
FIG. 13 is a sound pressure level SPL curve when the speaker module of the present invention is filled with attenuation material.

Specifically, as shown in FIG. 13, the SPL curve of ORI is compared with the SPL curve of ORI+internal impedance 1100 pa*s/m+ expansion space in the figure, horn barrel 2 from the sound output side of the speaker horizontal axis to the sound output opening 11 of the device generates a pit valley at a high frequency position. Use a small chamber to fill the attenuation material to increase the pipe damping and smooth the high frequency SPL curve. By increasing the local volume and changing the acoustic capacitor, the resonant frequency point can be controlled.

In this embodiment, the first section 21 includes the first opening 211, a first opening 212 connected to one end of the second section 22, and a first side wall 213 and a second side wall 214 formed by the first opening 211 extending to the first opening 212. Both ends of the first opening 211 gradually decrease and extend toward the direction of the first opening 212 to form the first arc surface 5. The sound output opening 11 transmits the sound of the speaker box 1 to the first opening 212 transmitted through the first opening 211. Both ends of the first opening 211 gradually decrease and extend toward the direction of the first opening 212 to form the first arc surface 5. The bottom surface of the first section 21 is plane 4, and the top surface is first arc surface 5. The sectional surface of the first section 21 of the horn barrel 2 is gradually changed in shape, which improves the sound quality of the horn barrel 2.

Wherein, the pen of one end of the horn barrel is the first opening 211, and the first opening 211 is the opening 9 of the horn barrel, which is used for connecting with the sound output opening 11.

In this embodiment, the length of the first opening 211 is greater than the length of the first opening 212, and the width of the first opening 211 is smaller than the width of the first opening 212, is convenient to gather the sound output by the sound output opening 11, and the sound quality is good.

In this embodiment, the second section 22 includes a third opening 221 matched with the first opening 212, a fourth opening 222 connected with one end of the third section 23, a side wall 223 and a fourth side wall 224 formed by bending and extending from the third opening 221 to the fourth opening 222. The third opening 221 is used to transmit the sound output by the first opening 212 to the fourth opening 222, through the fourth opening 222. The sectional surface structures of the first section 21 and the second section 22 are different. Meanwhile, the thicknesses of the first opening 211, the first opening 212 and the fourth opening 222 are gradually increased. The sound can be multi-level resonance, widening the frequency band range.

In this embodiment, the thickness of the third opening 221 is the same as the thickness of the first opening 212.

In this embodiment, the sectional surface of the fourth side wall 224 parallel to the thickness direction of the speaker box 1 is a semicircular structure. Easy to manufacture.

In this embodiment, the third side wall 223 and the fourth side wall 224 are vertically arranged, which is convenient to bend the second section 22 and save installation space.

In this embodiment, the third section 23 includes a fifth opening 231, a fifth opening 231 that cooperates with the fourth opening 222, a side wall 233 and t sixth side wall 234 extending away from the fourth opening 222 from the fifth opening 231, a sixth opening 232 connected between the fifth side wall 233 and the sixth side wall. The first side wall 213, the third side wall 223 and the fifth side wall 233 together form the avoidance position 3. Can be adapted to a variety of chassis.

Wherein, the opening at the other end of the horn barrel is the sixth opening 232, and the sixth opening 232 is the waiting port of the horn 10.

In this embodiment, the third section 23 protrudes to both sides parallel to the thickness direction of the speaker box 1 to form the third arc surface 7 and the fourth arc surface respectively.

In this embodiment, as shown in FIG. 14, the sensitivity of the sounding module of conventional side 2 at the same frequency is lower than those of these: multi-level horn plus sound port matching module 1; initial version level 2 horn 3; initial version level 2 horn plus sound absorbing material 4; multi-level horn with variable sectional surface 5; multi-level horn with variable sectional surface plus the sound absorbing material 6 and positive vocalization of large rear cavity module 7. Therefore, it can be seen from the above test results that, compared with the sounding module of conventional side 2, various solutions with a horn barrel have a higher frequency band. Wherein, the bandwidth and frequency response floating of multi-level horn matching plus sound output hole matching model 1 are higher than other schemes.

Compared with the related art, the speaker module of the present invention is used for a mobile terminal provided with a sound output port, and the speaker module includes a speaker box. The speaker box includes a sound output opening for side surface sound. The speaker module also includes a horn barrel connected to the sound output opening. The horn barrel is hollow in the middle and openings are arranged at both ends. The horn barrel is connected to the side surface of the speaker box and connected with the sound output opening, and the other end of the horn barrel is used to connect to the sound output port of the mobile terminal.

Along the sound output direction of the horn barrel, the sectional area of the horn barrel gradually changes; the horn barrel is designed as a variable sectional surface with different areas or lengths and widths for stakeout, the size of the variable sectional surface is directly related to the sound quality of each part of the horn barrel. The impeders of each part of the horn barrel are fully coupled to achieve multi-level resonance in a small volume and widen the frequency band range. At the same time, it is small in size and flexibly avoids space to adapt to the chassis of different mobile terminals.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker module for mobile terminal with a sound output port, including:

a speaker box having a sound output opening in a side surface thereof for generating sound;

a hollow horn barrel with two openings at both ends thereof, connected to the sound output opening; wherein one of the openings of the horn barrel communicates with the sound output opening, and the other opening of the horn barrel communicates with the sound output port of the mobile terminal; and an area of a cross-section of the horn barrel along a sound output direction is gradually changed;

the horn barrel includes a top surface and a bottom surface spaced along a thickness direction of the speaker box, and two side surfaces respectively connecting to the bottom surface and the top surface; the bottom surface and/or the top surface are curved.

2. The speaker module as described in claim 1, wherein the horn barrel includes a first section connected to the sound output opening, a second section that is bent and extended from the end of the first section away from the speaker box and is spaced from the speaker box, and a third section formed by extending from one end of the second section away from the first section; the third section is for connecting to the mobile terminal's sound output port; the two side surfaces corresponding to the second section are both arc surface; the bottom surface corresponding to the first section and the second section are both plane; the top surface corresponding to the first section is the first arc surface; the top surface corresponding to the second section is the second arc surface; the bottom surface and the top surface corresponding to the third section are the third arc surface and the fourth arc surface, respectively; the first arc surface, the second arc surface, the third arc surface and the fourth arc surface are different.

3. The speaker module as described in claim 2, wherein a bending radius of a connection between the first section and the second section is greater than 4 times a minimum wavelength.

4. The speaker module as described in claim 3, wherein an inner diameter of the connection between the first section and the second section is smaller than a half of the wavelength.

5. The speaker module as described in claim 2, wherein, the second section and/or the third section is filled with sound absorbing material.

6. The speaker module as described in claim 1, wherein the speaker box is rectangular, and the sound output opening is formed along a short axis edge of the speaker box.

7. The speaker module as described in claim 6, wherein the horn barrel includes a plurality of first sections arranged side by side along a width direction of the speaker box, a plurality of the second sections arranged alternately and stacked along a thickness direction of the speaker box; the third sections of the horn barrels are arranged side by side along a length direction of the speaker box.

* * * * *